United States Patent Office 3,377,322
Patented Apr. 9, 1968

3,377,322
THERMOPLASTIC POLYURETHANE ELASTOMERS SUITABLE FOR INJECTION MOLDING
William Kenneth Witsiepe, Wilmington, Del., assignor to E. I. du Pont de Nemours and Company, Wilmington, Del., a corporation of Delaware
No Drawing. Filed Dec. 30, 1963, Ser. No. 334,595
1 Claim. (Cl. 260—77.5)

This invention relates to thermoplastic elastomers and more particularly to polyether urethane/amide copolymer elastomers which are especially suited for fabrication by compression and injection molding as well as for other processes to which thermoplastics are subjected and which have desirable elastomeric properties when fabricated.

Injection and compression molding techniques are well known for the economical and rapid production of a variety of plastic items. These molding techniques are generally not applicable to the production of elastomeric parts because conventional elastomers are cross-linked and therefore are not thermoplastic; however, a few thermoplastic elastomers are known. These include the thermoplastic materials disclosed in U.S. Patent No. 2,929,801 in which the polymer chain includes 10 to 40% by weight of high melting segments obtained by reaction between a diamine and halide of a difunctional acid, 60 to 90% by weight of polyether derived segments, and optionally a minor proportion of low molecular weight glycol derived segments. By following the teachings of this patent, particularly the disclosure of preferred combinations of diamine and difunctional acid, highly useful thermoplastic elastomers can be prepared by melt spinning or extrusion. Unfortunately, however, these polymers are not altogether satisfactory for processing by injection molding for the reason that such high molding temperatures are required that some chemical decomposition of the polymer occurs. This is particularly the case under practical conditions encountered in commercial injection molding where a relatively long exposure to high temperatures is required.

Another group of thermoplastic elastomers, disclosed in U.S. Patent No. 2,929,802, contain the three types of segments reported in the above-mentioned patent with the amount of low molecular weight glycol derived units being 10 to 40% by weight. While these elastomers possess very desirable properties and utility, they have the disadvantage of tending to be deficient in set properties when compared to conventional cross-linked elastomers.

It is therefore an object of the present invention to provide thermoplastic elastomers which exhibit the combined characteristics of thermal processability and desirable elastomeric properties and thereby are especially suited for such processes as fabrication by compression and injection molding and for such products as molded articles, filaments, and other textile articles. Another object is to provide special thermoplastic copolyurethane/amide copolymer compositions to obtain these results. And another object is to provide a process for the preparation of these copolymers. Other objects will appear hereinafter.

It has been found that thermoplastic elastomers which are especially suited for injection molding and which have desirable physical properties are obtained when a few selected diamines are reacted with an amide-forming compound derived from certain dicarboxylic acids and with a bishaloformate of both a high molecular weight polyether glycol and a low molecular weight glycol, all in specific amounts. In particular, this improved characteristic is obtained when the diamine is piperazine or methyl substituted piperazine at the 2,5 or 2,3,5,6 positions and the dicarboxylic acid is adipic or succinic acid. When other combinations of diamine and acid reactants are employed or the composition limits are not observed, as by the following disclosure of the above-mentioned patents, elastomers having the combined characteristics of injection moldability and adequate compression set are not obtained.

The thermoplastic elastomers of the present invention can be defined as being linear and normally solid, and consisting essentially of the recurring units (a)

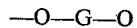

(b) —O—L—O— and (c) —D—, all connected by the bivalent acyl radical

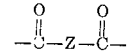

wherein, —O—G—O— is a bivalent radical obtained by removing the hydroxyl hydrogen atoms from a polyether glycol having an average molecular weight of 800 to 3000; —O—L—O— is a bivalent radical obtained by removing the hydroxyl hydrogen atoms from a glycol having a molecular weight of less than 200; —D— is a linear $C_2$ or $C_4$ alkylene radical; and

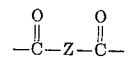

is a bivalent acyl radical wherein Z is a bivalent radical obtained by removing the amine hydrogens from a diamine selected from the group consisting of piperazine, 2-methyl piperazine, 2,5-dimethyl piperazine and 2,3,5,6-tetramethylpiperazine, said recurring units (a), (b), and (c) being present in amounts of 40–60 parts, 5–25 parts, and 2–5 parts, respectively per 100 parts of copolymer, all parts by weight, with the proviso that the elastomer contain units having the formula:

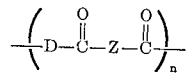

wherein the average value of $n$ is greater than one. The improved copolymers of the present invention possess the unique combination of properties of being both injection moldable and having desirable elastomeric properties, particularly set.

The improved polyether/urethane/amide copolymers of the present invention are preferably prepared by reacting the bishaloformates,

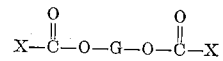

and

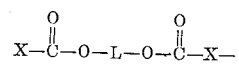

and the diacid halide,

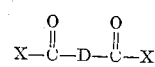

with at least a stoichiometric amount of a diamine, H—Z—H, wherein —G—, —L—, —D—, and —Z— have the same meanings given above and X is selected from the group consisting of chlorine and bromine.

The thermoplastic elastomers of the present invention, while completely soluble in many solvents, exhibit the usual characteristics of conventional reinforced, cross-linked elastomers. The polymers probably are linear as evidenced by their solubility behavior, but their properties suggest that they are reinforced by strong physical forces. In the present polyether/urethane/amide elastomers, these physical bonds can be ruptured reversably by heat at temperatures below those at which the polymer degrades chemically. On cooling to normal temperatures, the physical bonding is re-established and with it, the characteristics of conventional elastomers are re-established.

The following is a further description of the structural units constituting the improved copolymers of the present invention. All "parts" are by weight.

The first structural unit, referred to as —O—G—O, is a bivalent radical obtained by removing the hydroxyl hydrogen atoms from a polyether glycol, HO—G—OH, having a number average molecular weight of 800–3000. Polyalkyleneether glycols are the preferred polyether glycols for use in the present invention. They may be represented by the general formula HO(RO)$_n$H, wherein R is an alkylene radical which may be the same or different and $n$ is an integer having a value such that the glycol has a number average molecular weight of 800–3000. These glycols can be prepared by the polymerization of cyclic ethers such as alkylene oxides and tetrahydrofuran by known methods. Of the polyalkyleneether glycols, polytetramethyleneether glycol and polypropyleneether glycol are especially preferred. Other related glycols, such as polyalkyleneetherthioether glycols and polyalkylene-aryleneether gycols may also be used. The structural unit —O—G—O is preferably introduced into the copolymers of this invention by employing the glycol in the form of its bishaloformate.

The second structural unit, referred to as —O—L—O—, is a bivalent radical obtained by removing the hydroxyl hydrogen atoms from a glycol, HO—L—OH, having a molecular weight of less than 200. The glycols which may be employed to furnish this structural unit should contain two aliphatic hydroxyl groups. The bivalent radical —L— may be substituted with groups which do not interfere with the preparation or use of the copolymers. Examples of such groups include alkyl, aryl, alkoxy, aryloxy and alkenyl groups. Glycols in which the bivalent radical —L— is aliphatic, cycloaliphatic, or aliphatic-aromatic may be used as long as both hydroxyl groups are connected to aliphatic carbons. Specific examples of suitable glycols include ethylene glycol, 1,2-propylene glycol, neopentyl glycol, 1,3-butanediol, 1,4-butanediol, 1,5-pentanediol, 2-methyl-1,4-butanediol, 2-ethyl-2-methyl-1,3-propanediol, 2-butyl-2-methyl-1,3-propanediol, 2-allyloxy methyl-2-methyl-1,3-propanediol, cyclohexanediol and diethylene glycol. Mixtures of these glycols may be employed to advantage on occasion. Of these, 1,4-butanediol and neopentyl glycol are especially preferred. A preferred mixture of glycols employs a 3:1 molar ratio of neopentyl glycol and butanediol-1,4. As in the case of the polyether glycol, the units derived from the low molecular weight glycol may be introduced into the polymers of this invention in the form of a bishaloformate.

The third structural unit, referred to as —D—, is a linear C$_2$ or C$_4$ alkylene radical which is the residue of and may be considered as derived from a dibasic acid HOOC—D—COOH. Suitable dibasic acids included are limited to succinic and adipic acids, with adipic acid being preferred. This structural unit, —D—, can, as indicated be introduced into the copolymers of this invention in the form of a diacid halide.

The fourth structural unit, referred to as

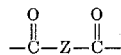

is a bivalent acyl radical wherein —Z— is a bivalent radical obtained by removing the amine hydrogens from only certain diamines which are selected from the group consisting of piperazine, 2,5-dimethylpiperazine, 2-methyl piperazine, and 2,3,5,6-tetramethylpiperazine. These diamines are believed to be useful in the present invention because they have both a highly symmetrical ring and secondary amine groups. Of these diamines, piperazine is by far preferred because of its availability. This structural unit may be introduced into the copolymers of the present invention by reacting a glycol bishaloformate or a diacid halide with piperazine or the named substituted piperazines.

The bivalent radical,

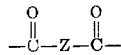

serves as the connecting link between the other polymer structural units; namely, —O—G—O, —O—L—O—, and —D—. The units —O—G—O and —O—L—O— may occur in any order in the polymer chain as long as the —D— units, in combination with the connecting unit,

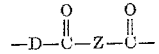

do not occur entirely as isolated

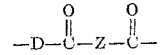

units. In other words, the combined units,

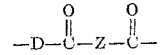

must be arranged so that the average value of $n$ in the structures

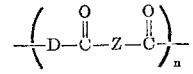

which occur in the copolymer chains must be greater than one.

The specialized urethane/amide copolymers of the present invention must contain the four types of structural units in the amounts set forth. As a consequence, it is found that the polyether urethane/amide copolymers have "film forming temperatures" of less than about 255° C.

The "film forming temperature" is a convenient measure of the suitability of polymers designed for use in compression and injection molding processes. This measurement was developed in connection with the work leading to the present invention. The film forming temperature is determined in the following way. Approximately 10 grams of freshly prepared polymer in granules about 3 mm. diameter is placed between two 6″ x 6″ pieces of heavy aluminum foil. This "sandwich" is placed between the heated platens of a hydraulic press and a pressure of about 500 p.s.i. is applied with the platens heated to various set temperatures. The sample is held under heat and pressure for one minute. The lowest temperature which results in the production of a clear, smooth to the touch, uniform film less than 0.25 mm. thick, which does not shrink appreciably on pressure release, is called the "film forming temperature." Film forming temperatures are defined within ±10° C. by this procedure. Copolymers of the present invention having film forming temperatures in the range of about 150° C. to 255° C. have in general been found to be most useful and readily processible by compression and injection molding.

While the film forming temperature gives an indication of the temperature requirements for injection molding, it is usually somewhat lower than the temperature actually required for commercial injection molding. Copolymers having film forming temperatures below about 255° C. can be readily processed in commercial equipment at temperatures below and up to a limit of about 300° C. which represents the point at which decomposition begins to occur. Copolymers of the present invention having film forming temperatures greater than only about 150° C. possess good elastomeric properties as indicated by conventional measurements of stress-strain, resilience, compression set, set at break, and tear strength. The elastomers of the present invention usually exhibit hardness in the Shore A 60 to 85 range. Copolymers having film forming temperatures below about 150° C. generally are not as tough as those copolymers having higher film forming temperatures; however, they are still useful in specialized applications and may be processed by injection or compression molding. In addition to predicting molding behavior, film forming temperature is also an indication if a given copolymer will be soluble in selected solvents. In general, copolymers having film forming temperatures below about 255° C. are completely soluble in suitable solvents and form gel-free solutions.

The polyether urethane/amide copolymers of the present invention must contain between 40 and 60 parts of —O—G—O— units which are polyether derived units per 100 parts of copolymer in order to be processible and to have suitable elastomeric properties. If present in amounts of less than 40 parts per 100 parts of copolymer, the product tends to be more plastic in nature than elastic. If present in amounts of greater than 60 parts per 100 parts of copolymer, the product will lack toughness.

The units, —D—, which may be considered as being derived from a dicarboxylic acid, may be present in the copolymers of the present invention in amounts of 2 to 5 parts per 100 parts of copolymer. If greater than about 5 parts of these units are employed per 100 parts of copolymer, the resulting product usually has a film forming temperature greater than 255° C. The minimum amount of these units which can be employed; that is, 2 parts, is required to produce a copolymer having adequate toughness. Copolymers containing from about 0.75 to 1.5 moles of —D— units per mole of

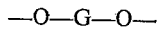

units which also meet the composition requirements expressed in parts, represent a preferred class of polymers.

The structural units, —O—L—O—, which are most conveniently derived from a low molecular weight glycol, can be present in the copolymers of the present invention in amounts of 5 to 25 parts per 100 parts of copolymer. If the quantity of —O—L—O— units exceeds about 25 parts, the resulting product tends to be more plastic than elastic. Usually at least about 5 parts of these structural units per 100 parts of modified copolymer are required to produce a product having a film forming temperature below 255° C. The exact amount of glycol required will vary with the particular low molecular weight glycol being employed and the film forming temperature which is desired. In general, the lower the molecular weight of the —O—L—O— units, the smaller is the amount which is required to yield copolymers having an acceptable film forming temperature. Thus a given weight of ethylene glycol would be expected to give a product having a lower film forming temperature than observed for a product containing the same weight of 1,4-butanediol. The structure of the particular glycol used also governs the amount of low molecular weight glycol derived units required. While it is difficult to predict with certainty the effect of a specific low molecular weight glycol, it appears that symmetrical glycols in which the hydroxyl groups are not sterically hindered are generally required in greater amounts than unsymmetrical glycols in which the hydroxyl groups are sterically hindered. Compositions containing from 1 to 3 moles of —O—L—O— units per mole of —O—G—O— units, which also meet the composition requirements expressed in parts by weight, represent a preferred class of copolymers.

The modified polyether urethane/amide copolymer elastomers of the present invention may be prepared most conveniently by what might be called a solution/interfacial polymerization. Briefly, this polymerization involves (1) partially reacting a mixture of polyether glycol bishaloformate, low molecular weight glycol bishaloformate and diacid halide, dissolved in an inert water-immiscible solvent, with piperazine or a substituted piperazine as previously named and (2) adding an aqueous solution of an acid acceptor such as sodium carbonate to neutralize halogen acid generated by the reaction of step (1) so that all of the piperazine is available to complete the reaction with the bishaloformates and diacid halide. This procedure may be employed for batch or continuous preparation of the subject elastomers. If carried out in the manner to be described hereinafter, it produces polymers of acceptable molecular weight in which the units,

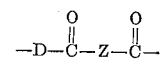

are not isolated but are at least partially joined to one another so that the average value of $n$ in

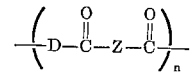

groupings is greater than one.

The required bishaloformates for use in this procedure may be either chloro- or bromo-derivatives, but the bischloroformates are definitely preferred. The bischloroformates are conveniently prepared by adding polyether glycol, low molecular weight glycols or mixtures thereof to an excess of liquid phosgene and refluxing the resulting mixture for about 12 hours. Following the reaction, hydrogen chloride and excess phosgene are removed by passing a stream of dry nitrogen through the reaction mass. The bisbromoformates may be formed similarly from glycols and carbonyl bromide. Preparation of the diacid halides, which may also be either chloro- or bromo-derivatives, with chlorides preferred, is well known.

The inert water-immiscible solvents which are used in the solution/interfacial polymerization should be capable of dissolving the polymeric reaction product. The solvent should not react at an appreciable rate with the reactants. In addition, it is usually desirable to use a low-boiling solvent to facilitate isolation of the polymer. Many halogenated aliphatic hydrocarbon solvents have been found to be useful for carrying out the polymerization. Halogenated hydrocarbons containing the group, —CHX$_2$, wherein X is bromine or chloride, are usually very good solvents and preferred examples include methylene chloride, chloroform, 1,1,2-trichloroethane and 1,1,2,2-tetrachloroethane. In carrying out the solution/interfacial polymerization, the mixture of the three acid halide components is usually diluted to about a 10% concentration in the inert solvent selected. Piperazine or a substituted piperazine can be added as a solid, but preferably is added as a solution in the same solvent employed for the halide components. The concentration of the piperazine solution may have any convenient value but concentrations around 2% are preferred.

The aqueous solution of acid acceptor which is added after partial reaction between the halides and piperazine is required to react with hydrogen halide acid which is formed as a by-product during polymerization. The preferred acid acceptor is sodium carbonate which can be conveniently employed as a 10% aqueous solution. Other suitable acceptors include sodium hydroxide, sodium bicarbonate and potassium bicarbonate. An excess of piperazine may also be used as an acceptor, but the excess should be added as an aqueous solution. If a very large excess of piperazine is added directly to the mixture of halides in the inert solvent solution, the molecular weight of the product may be lowered. Tertiary amines, such as triethylamine and pyridine, may also be used as acid acceptors but should again be added in aqueous solution so that the latter stages of the reaction will occur under conditions of interfacial polymerization.

When the copolymers of the present invention are prepared by the solution/interfacial polymerization, piperazine or substituted piperazine may be conveniently employed in excesses of 1% to 10% of that calculated to be required for reaction with the mixture of the three acid halides. This excess is exclusive of any piperazine added as an acid acceptor. Because of the interfacial technique employed in the latter part of the polymerization, which apparently limits the availability of piperazine, an excess of piperazine does not lower the molecular weight of the polymer. However, if sufficient piperazine is not present, the molecular weight of the polymer will be low. Rather than attempt to add the exact amount of piperazine required and run the risk of being short on piperazine, it is usually preferred to deliberately add a limited excess.

The solution/interfacial polymerization can be performed batchwise by preparing a solution in a suitable solvent of the two bishaloformates and the diacid halide in a vessel equipped for vigorous shearing agitation, such as a Waring Blender. To this solution is added piperazine or substituted piperazine either as a solid or in solution. This addition may be started at room temperature and should be performed as rapidly as possible without causing the reaction mass to boil over. Within about 30–60 seconds after the addition of the piperazine is started, 10% aqueous sodium carbonate is added as rapidly as possible. Since the reaction is exothermic, the temperature will rise but will not exceed the boiling point of the solvent as long as solvent may evaporate. Control of the temperature without the loss of excessive amounts of solvent vapor can be easily accomplished by adding ice. Once all of the ingredients have been added, the reaction is usually complete within about 4 to 20 minutes. The addition of the solution of sodium carbonate must be completed rapidly once started for if only a part of the solution is added some of the piperazine will not be available and remaining acid halides will start to react with water which was introduced along with the sodium carbonate. This hydrolysis is undesirable because it introduces more or less monofunctionality into the polymer. The diacid halide, the most reactive material of the three halide components, appears to be most susceptible to this hydrolysis.

Following the reaction, the copolymer may be isolated by steam distilling away the solvent, filtering and washing to remove salts. Vigorous agitation is desirable during solvent removal since the copolymer will separate in small particles under these conditions rather than in large masses which may be formed with poor agitation. The isolated polymer may be dried in an air or vacuum oven.

In performing the polymerization batchwise, one is not retricted to the order of additions described above. For example, piperazine or substituted piperazine, acid acceptor, water and the inert organic solvent may all be placed in the agitated reaction vessel to which is then rapidly added a mixture of the three acid halide components. This scheme of addition apparently is satisfactory because the acid halide components are extracted and dissolved into the inert organic phase present in the reactor before they have a chance to hydrolyze with water phase. It is also possible to run the polymerization by adding an aqueous solution of acid acceptor and piperazine to a solvent solution of the three halide components contained in a reactor. Addition of any one of the three acid halide components without mixing with the other two components is undesirable because the units derived from the three halide components should be distributed more or less randomly along the polymer chain, with the exception of course, that a portion of the units derived from the diacid halide should be joined in groups of more than one. In the solution/interfacial polymerization, the joining of some of acid halide derived units in groups of more than one unit appears to be accomplished automatically when all three types of halides are present as a mixture because the reactivity of the diacid halide is much greater, perhaps 1000 times greater, than the reactivity of the bischloroformates and the quantity of piperazine actually available at any given time throughout the course of the reaction is less than the stoichiometric requirement.

Preparation of the copolymers of the present invention may also be performed by continuous solution/interfacial polymerization. Equipment for such continuous preparation can consist of two well-agitated vessels in series. A solution of the three acid halide components and piperazine solution are continuously introduced near the bottom of the first vessel. Partially reacted mass is removed from the top of this vessel by overflow and contacted with acid acceptor in the second vessel. Obviously, the streams are fed to the reactors at rates such that all ingredients will be present in the proper amounts and at a total rate such that the holdup times in the vessels will permit the reaction to approach completion. This system, while exceedingly simple, has a serious drawback. In order to produce satisfactory polymer with it, a relatively large excess of piperazine must be employed, for if only the stoichiometric equivalent of the three acid halides is employed the contents of the second reactor will be running at zero or close to zero piperazine concentration at all times. As indicated under the discussion of batch solution/interfacial polymerization, operation in the absence of piperazine or in the presence of only a trace of piperazine permits hydrolysis of the acid halide components and especially the hydrolysis of the diacid halide. The net result is the introduction of monofunctionality into the polymer which lowers the molecular weight of the product.

The need for employing large excesses of piperazine, which is uneconomical even if excess material is recovered, can be avoided by employing different equipment in the continuous solution/interfacial polymerization. In the preferred types of equipment, back-mixing is minimized after the reactants have been brought together. One convenient form of apparatus which minimizes back-mixing consists of a long pipeline giving a holdup time of at least about 4 minutes with about three low volume mixers placed along the pipeline to insure proper contacting of the system. The first mixer should be placed in the pipeline near the point at which the solutions of acid halide mixture and piperazine are introduced. Better still, the solutions may be introduced directly into the mixer. Following the first mixer, an aqueous solution of acid acceptor is added. Subsequent mixers are required because the system after the addition of acid acceptor tends to separate into two layers until considerable polymerization has taken place. After some polymerization has occurred, the polymer present serves as a surface active agent and permits a relatively stable emulsion to be formed. Once a stable emulsion has been produced, further mixing is not required for the completion of the reaction. Operating in this fashion simulates the batch procedure in which the acid halides and piperazine are quickly brought together and shortly thereafter, the acid acceptor is added rapidly. Other forms of reactors in which back-mixing is minimized may also be used. For example, one may use a number of vigorously agitated reactors (connected in series) with the acid halide and piperazine feeds being introduced into the first reactor and the overflow from the first reactor passing through the second and so on. Using this system, acid acceptor is introduced into one of the reactors following the first reactor. A much elongated reactor or a reactor compartmented with screens with agitation in each stage may also be used with feeds being added at suitable positions. Isolation of the polymer following continuous preparation may be performed batchwise or continuously. Recovery of the polymer which separates after steam distillation of solvent can be accomplished by either batch filtration and washing or by continuous filters capable of continuous washing.

The copolymers of the present invention may also be prepared from the same reactants by means of solution polymerization. The solvent or solvents employed in this process preferably are similar to those employed in the solution/interfacial polymerization procedure. Methylene chloride, for example, is again satisfactory as a solvent. This method involves dissolving the acid halide components in a portion of a solvent and piperazine or a substituted piperazine plus a tertiary amine acid acceptor in a second portion of the same solvent or a different but miscible organic solvent. The piperazine solution may be added to the diacid halide solution or vice versa until the polymer has reached an adequate molecular weight which usually may be determined by continuously measuring the viscosity of the reaction medium. Isolation of the copolymer may be performed after solvent polymerization by essentially the same methods as those described above for the isolation of polymer produced by the solution/interfacial polymerization.

While preparation of the copolymers of the present invention is most conveniently carried out by employing a mixture of the three acid halide components and piperazine, other routes are available for their preparation. For example, a mixture of polyether glycol bischloroformate and low molecular weight glycol bischloroformate may be reacted in an inert solvent with an excess of piperazine to produce a polymeric product terminated with piperazine units and having a molecular weight of about 10,000. This polymer, which has terminal amine groups, may be mixed with additional piperazine and reacted with adipyl chloride in an inert solvent to produce the polymers of this invention. Alternatively, the adipyl chloride may be replaced with the diamide derived from adipic acid and imidazole. In this case, imidazole is formed as a by-product rather than hydrogen chloride and no acid acceptor is required.

Many of the compounding agents used in conventional elastomers may be employed to advantage in the copolymers of the present invention. Actually, it is desirable to employ antioxidants in the present elastomers. Useful antioxidants include such materials as 2,2'-methylenebis (4-methyl-6-tertiary-butylphenol), symmetrical di-$\beta$-naphthylamine-p-phenylene diamine, and nickel dibutyldithiocarbamate. These materials are effective in preventing oxidative degradation when employed at levels ranging from about ½% to 2% by weight. They may be added to the copolymer of the present invention by dry mixing with the copolymer followed by passing the mixture through a melt extruder or they may be introduced into the copolymer by mixing in a Banbury mixer at a temperature above about 200° C. However, it is preferred to add the antioxidants to the polymer slurry resulting from steam distillation, prior to isolation and air drying. When this is done, the polymer is protected against oxidation even during the latter stages of isolation. Stabilizers which prevent polymer degradation resulting from exposure to light may also be employed to advantage in the present elastomers. 2,2'-dihydroxy-4,4'-dimethoxybenzophenone and 2(2'-hydroxy - 5' - methylphenyl)benzotriazole are common representatives of the types of screening agents useful in the compounds. Fillers such as silica gel and carbon black may be used to change the mechanical properties of the elastomers. More than 50 parts of reinforcing carbon black per 100 parts of polymer can be employed to yield stocks which are still suitable for injection molding. Pigments can also be incorporated. Titanium dioxide is especially useful in preparing light colored stocks. Stocks having low coefficients of friction may be prepared by adding finely divided fluorocarbon polymers and telomers, consisting essentially of repeating —$CF_2CF_2$— units, to the copolymers of this invention. These stocks are useful for fabricating bearing surfaces. While small amounts of pigments and fillers can be added to the polymer solution prior to isolation, it is better to add large amounts of filler at elevated temperatures approaching 200° C. and above in Banbury mixers or twin screw extruders. For convenient use in injection molding equipment, compounded polymer may be formed into small pellets by passing the material through an extruder to form a coarse thread ⅛" to ¼" in diameter which after cooling may be chopped into pieces about ⅛" to ³⁄₁₆" in length. In this form, the material can be readily fed to standard commercial injection molding equipment.

The polymers of the present invention may be plasticized with a variety of polyesters such as dibutyl sebacate, dioctyl phthalate and polymeric polyester plasticizers. In addition to polymeric polyester plasticizers, blends may be made with other polymeric materials such as vinyls and polyamides. By employing suitable blends, one can prepare a variety of products ranging from softer elastomers on up to materials approaching plastics. In general, such blends are suitable for compression or injection molding. Blends may also be prepared in solution for use as finishes.

The polyether urethane/amide copolymers of this invention have many uses. As previously indicated, they are ideal for compression or injection molding and thus may be used for a variety of accurately molded elastomeric parts. They are especially suited for molding complex mechanical forms such as gears, gaskets, belts and seals. In addition, articles can be formed from the polymers by blow molding, transfer molding and vacuum forming techniques. Extruded goods may be made from the copolymers in the form of rods, films, sheets, tubing, gasketing and nets. The elastomers may be calendered onto fabrics and other similar substrates. Fibers or filaments having outstanding properties may also be produced from these materials by means of melt spinning. The elastomers may be used as hot melt adhesives. Because of their adhesive properties and thermoplastic behavior, the copolymers of the present invention may be used as bonding or laminating agents in preparing safety glass.

Solutions of these copolymers in suitable solvents, having concentrations in the range of 10 to 20%, are useful for preparing dipped goods and may be employed as leather finishes, plastic finishes and adhesives for bonding metals, textiles and elastomers. The solutions also may be used for treating textiles or fiberglass fabrics. Reticulated webs or films or fibers may be prepared from the solutions by spraying onto suitable targets by processes such as that disclosed in U.S. Patent 2,810,426. Fibers may also be formed from solutions by forcing through orifices and evaporating the solvent.

The preferred solvents for producing the solutions required for the above uses include the same solvents suggested for the preparation of the copolymers, examples of which are methylene chloride, 1,1,2 - trichloroethane and 1,1,2,2 - tetrachloroethane. Other solvents, not suitable in the preparation of the polymers because of reactivity, are useful with the final polymers. These include m-cresol and low molecular weight aliphatic carboxylic acids. Mixtures of solvents may be employed to advantage to increase solubility or to control drying rates. As previously indicated, solutions of blends of the copolymers with a variety of other polymers and resins are useful as finishes and adhesives.

Solvent adhesives can be prepared by incorporating up to about 20 parts of an organic di- or polyisocyanate per 100 parts of copolymer dissolved in an inert organic solvent, such as methylene chloride, or 1,1,2 - trichloroethylene. Any organic di- or polyisocyanate may be used in preparing these adhesives, but aromatic di- or polyisocyanates are preferred. Examples of suitable isocyanates include 2,4 - tolylene diisocyanate, 2,6 - tolylene diisocyanate, 1,3 - phenylene diisocyanate, methylenebis (4 - phenylisocyanate), 4,4',4" - triisocyanatotriphenyl methane and polyarylpolyisocyanates such as disclosed in U.S. 2,683,730. Both crude and refined grades of the di- and polyisocyanates may be used, but refined materials obviously are preferred when a colorless, transparent adhesive is desired. Crude and refined grades of methylenebis(4 - phenylisocyanate) are especially preferred for preparing these compositions. These adhesives are conveniently made by dissolving the di- or polyisocyanate in a previously prepared copolymer solution, but preparation is not restricted to this procedure. The preferred concentration of copolymer in the solvent adhesives is about 10%. The preferred amount of isocyanate is about 2 to 5 parts per 100 parts of copolymer. These adhesives have been found to form strong bonds on a variety of substrates including metals, elastomers, fabrics and plastics. Bonds may be formed by applying one or more coats of cement to the substrates involved, pressing the substrates together and allowing the assembly to dry at room temperature.

The following examples will better illustrate the nature of the present. However, the invention is not intended to be limited to these examples. Parts are by weight unless otherwise indicated.

Example 1

A mixture of 500 grams of polytetramethyleneether glycol (number average molecular weight about 1000) and 90 grams of 1,4 - butanediol is added to 1 liter of liquefied phosgene contained in a 2 liter flask. This mixture is refluxed for 12 hours. The temperature of the mass during this step is about 9° C. Excess phosgene is removed from the reaction product by heating to 25° C. and passing dry nitrogen through the mass which is agitated vigorously. This treatment is continued until the content of phosgene is reduced to below 100 p.p.m. (The concentration of phosgene in the bischloroformate is determined by titration with a solution of triethylamine in benzene. In this titration, one mole of phosgene is equivalent to one mole of triethylamine. The end point is determined potentiometrically.) About 770 grams of mixed bischloroformate is obtained.

About 250 grams of the mixture of bischloroformates produced above and 29.3 grams of adipyl chloride are added to 2250 ml. of methylene chloride contained in a 1-gallon Waring blendor. The blendor is turned on and 57.8 grams of anhydrous piperazine is added in about 30 seconds. Agitation is continued for one minute after which 800 ml. of sodium carbonate solution, prepared using 10 grams of sodium carbonate per 100 ml. of water, is added. Agitation is continued for an additional 20 minutes and 2.8 grams of 2,2' - methylenebis(4 - methyl - 6 - tertiary - butylphenol) is added and blended in. About 1 liter of water is added to the blendor and steam is passed through the mass to remove methylene chloride. Agitation is continued in the blendor during this latter operation and the polymer precipitates in the form of fine particles as the solvent is removed. Polymer is collected on a filter and is washed with hot water until the sulfated ash content of the polymer on a dry basis is reduced to 0.1 to 0.2% by weight. The washed copolymer is dried in an air oven at a temperature of about 120° C. for 5 hours. The approximate water content of the dry polymer is 0.5%.

The quantities of reactants used in preparing this copolymer correspond to 1 mole of polytetramethyleneether glycol, 2 moles of 1,4 - butanediol, 1 mole of adipyl chloride, and 4.2 moles of piperazine. Piperazine is employed in excess and only about 4 moles are incorporated into the polymer. The composition corresponds to 55.7, 9.9, and 3.1 parts per 100 parts of copolymer of polyether, low molecular weight glycol and diacid units, respectively.

The film forming temperature of this polymer is about 225° C., measured by the procedure described in the disclosure. The film forming temperature of the corresponding polyether/amide copolymer is 300° C. Test pieces for stress-strain measurements and compression set measurements are prepared by molding in a 1-ounce Watson-Stillman injection molding machine operated at 250° C. and 7500 p.s.i. with a 30° C. mold temperature without indication of any degradation by heat. Stress-strain test pieces and compression set pellets are also prepared by compression molding at 225° C. and about 100 p.s.i. for 1 minute and cooling the mold before releasing the pressure. Properties of both compression molded and injection molded copolymer, prepared by the procedure given above, are as follows:

|  | Injection Molded | Compression Molded |
|---|---|---|
| $M_{300}$, p.s.i. | 2,350 | 1,750 |
| $T_B$, p.s.i. | 5,100 | 7,400 |
| $E_B$, percent | 600 | 590 |
| $S_B$, percent | 103 | 65 |
| Disc Tear, p.l.i. | | 228 |
| Yerzley Resilience, 25° C., percent | | 80 |
| Compression Set, percent (22 hrs. at 70° C.) | | 59 |
| Hardness, Shore A | | 80 |

Copolymer produced by the above procedure is soluble in a 1:1 volume mixture of methylene chloride and 1,1,2-trichloroethane. Solutions containing about 12 grams of polymer per 100 grams of solution have a viscosity in the range of 2000 cps.

When the above procedure is repeated using an equivalent of hexamethylene diamine in place of piperazine, a copolymer is produced which can be injected molded. The injection molded material has the following properties:

$M_{300}$, p.s.i. ------------------------------------ 2300
$T_B$, p.s.i. --------------------------------------- 6100
$E_B$, percent ------------------------------------- 660
$S_B$, percent ------------------------------------- 209

The stress-strain properties of this material are comparable to those of the piperazine copolymer, but set at break is nearly double that of the piperazine copolymer.

Example 2

A mixture of bischloroformates is prepared by reacting 500 grams of polytetramethyleneether glycol (number average molecular weight about 1000) and 104 grams of neopentyl glycol with phosgene following the procedure given in Example 1.

A portion of the mixed bischloroformates is converted to polymer by the procedure given in Example 1, but at ⅕ the scale used in Example 1. About 50 grams of mixed bischloroformate, 5.78 grams of adipyl chloride and 11.42 grams of anhydrous piperazine are employed. Other reagents are employed in ⅕ the amount used in Example 1. Preparation is carried out in a 1-quart Waring Blendor. The polymer so produced contains the equivalent of 1 mole of polytetramethyleneether glycol, 2 moles of neopentyl glycol, 1 mole of adipyl chloride and 4.0 moles of piperazine. Its composition corresponds to 54.9, 11.2 and 3.1 parts per 100 parts of copolymer of polyether, low molecular weight glycol and diacid units, respectively.

The film forming temperature of this polymer is about 200° C. The polymer may be injection molded at 250 to 275° C. and 7500 p.s.i. in a 30° C. mold. Test pieces prepared by compression molding at 225° C. and 1000 p.s.i. for 1 minute have the following physical properties:

$M_{300}$, p.s.i. ------------------------------------ 1140
$T_B$, p.s.i. --------------------------------------- 6700
$E_B$, percent ------------------------------------- 590
$S_B$, percent ------------------------------------- 0
Disc tear, p.l.i. ---------------------------------- 89
Yerzley resilience, 25° C., percent --------------- 77
Compression set, percent (22 hrs. at 70° C.) ------ 32
Hardness, Shore A --------------------------------- 68

The polymer is soluble in a 1:1 methylene chloride/1,1,2-trichloroethane solvent mixture.

When the above procedure is repeated using equivalent amounts of glutaryl or suberyl chloride in place of adipyl chloride, copolymers are produced which have the following properties after molding:

|  | Glutaryl | Suberyl |
|---|---|---|
| $M_{300}$, p.s.i. | 210 | 250 |
| $T_B$, p.s.i | 1,800 | 1,700 |
| $E_B$, percent | 950 | 700 |
| $S_B$, percent | 25 | 37 |
| Disc Tear | 44 | 31 |
| Yerzley Resilience, 25° C., percent | 67 | 71 |
| Compression Set, percent (22 hrs./70° C.) | 98 | 91 |
| Hardness, Shore A | 60 | 60 |
| Film Forming Temperature, ° C | 180 | 180 |

It will be noted that both copolymers lack toughness as indicated by low tensile and tear strengths. In addition, the compression set values are about three times as high as those for the copolymer of this example which is derived from adipyl chloride.

To further illustrate the critical nature of the components employed in preparing the copolymers of this invention, the procedure above is repeated once more with an equivalent amount of terephthallyl chloride replacing adipyl chloride. The copolymer produced has such a high film forming temperature that molding is impossible.

Example 3

This example illustrates the changes in properties for a series of copolymers containing the same molar amount of low molecular weight glycol derived units and increasing amounts of diacid derived units. The property changes observed with 2 sets of compositions are presented.

The 5 copolymers of the first series each contain 2 moles of low molecular weight glycol derived units originating from 2-ethyl-2-methylpropanediol-1,3 for each mole of polytetramethyleneether glycol derived units. The required mixture of bischloroformates is prepared by adding 47.2 grams of 2-ethyl-2-methylpropanediol-1,3 and 200 grams of polytetramethyleneether glycol (molecular weight about 1000) to about 750 ml. of liquid phosgene and proceeding as in Example 1. The amounts of reagents employed in preparing the copolymers, their compositions in parts per 100 parts, and physical properties are presented in Table I.

TABLE I

Effect of Adipic Acid Units on the Properties of a Copolyurethane Prepared from 2 Moles of 2-ethyl-2-methylpropanediol-1,3 and 1 Mole of Polytetramethyleneether Glycol (1000)

|  | Copolymer Sample | | | | |
|---|---|---|---|---|---|
|  | A | B | C | D | E |
| Moles of Diacid Units/Mole of Polyether Glycol Units | 0.0 | 0.5 | 1.0 | 1.5 | 2.0 |
| Reagents: |  |  |  |  |  |
| Mixed Bischloroformates, g | 50.0 | 25.0 | 50.0 | 25.0 | 25.0 |
| Adipyl Chloride, g |  | 1.42 | 5.67 | 4.26 | 6.23 |
| Piperazine, g | 8.38 | 4.88 | 11.18 | 5.68 | 6.92 |
| Copolymer Composition in Parts/100 Parts: |  |  |  |  |  |
| Diacid Units |  | 1.6 | 3.0 | 4.3 | 5.5 |
| Polyether Units | 60.5 | 57.1 | 54.1 | 51.4 | 48.9 |
| Low M.W. Glycol Units | 14.0 | 13.3 | 12.5 | 11.9 | 11.3 |
| Copolymer Physical Properties: |  |  |  |  |  |
| $\eta$inh, m-cresol | 2.62 | 2.41 |  | 2.30 | 2.26 |
| $M_{300}$, p.s.i | (¹) | 490 | 800 | 890 | 1,700 |
| $T_B$, p.s.i | (¹) | 4,200 | 5,900 | 6,300 | 6,800 |
| $E_B$, Percent | (¹) | 890 | 730 | 750 | 660 |
| $S_B$, Percent | (¹) | 21 | 19 | 19 | 51 |
| Tear Strength, D-740, p.l.i | (¹) | 44 | 75 | 78 | 177 |
| Film Forming Temperature, ° C | <100 | 160 | 200 | 220 | 260 |

¹ Weak gum.

The 4 copolymers of the second series contain 2 moles of low molecular weight glycol units derived from neopentyl glycol for each mole of polytetramethyleneether glycol derived units from glycol having a number average molecular weight of about 1000. The required mixture of bischloroformates for preparing these copolymers is obtained by adding 104 grams of neopentyl glycol and 500 grams of polytetramethyleneether glycol to about 1 liter of liquefied phosgene and proceeding as in Example 1. Weights of reagents, polymer composition and physical properties are presented in Table II.

TABLE II

Effect of Adipic Acid Units on the Properties of a Copolyurethane Prepared from 2 Moles of Neopentyl Glycol and 1 Mole of Polytetramethyleneether Glycol (1000)

|  | Copolymer Sample | | | |
|---|---|---|---|---|
|  | F | G | H | I |
| Moles of Diacid Units/Mole of Polyether Glycol Units | 0.0 | 1.0 | 1.5 | 2.0 |
| Reagents: |  |  |  |  |
| Mixed Bischloroformates, g | 50.0 | 50.0 | 50.0 | 50.0 |
| Adipyl Chloride, g |  | 5.78 | 8.67 | 11.56 |
| Piperazine, g | 8.55 | 11.42 | 12.85 | 14.29 |
| Copolymer Composition in Parts/100 Parts: |  |  |  |  |
| Diacid Units |  | 3.1 | 4.4 | 5.6 |
| Polyether Units | 61.6 | 54.9 | 52.1 | 49.6 |
| Low M.W. Glycol Units | 12.6 | 11.2 | 10.6 | 10.1 |
| Copolymer Physical Properties: |  |  |  |  |
| $M_{300}$ p.s.i | 1,150 | 1,140 | 1,625 | 2,200 |
| $T_B$. p.s.i | 4,700 | 6,700 | 8,100 | 7,400 |
| $E_B$, percent | 580 | 590 | 525 | 560 |
| $S_B$. percent | 15 | 0 | 10 | 25 |
| Tear Strength. Disc, p.l.i | 88 | 89 | 150 | 175 |
| Yerz. Resilience, 25° C., percent | 85 | 77 | 67 | 64 |
| Compression Set, percent (22 hrs./70° C.) | 50 | 32 | 32 | 28 |
| Hardness, Shore A | 82 | 68 | 75 | 80 |
| Film Forming Temperature, ° C | 160 | 225 | 240 | 275 |

The data in the two tables indicate that an increase in the amount of diacid derived units in the presence of a constant amount of low molecular weight glycol derived units increases the film forming temperature and yields tougher copolymers. Copolymers A and F contain no diacid derived units; Copolymer A is a weak gum and copolymer F is deficient in properties when compared with similar copolymers containing diacid derived units. With the maximum amounts of diacid units employed in preparing these copolymer series, the film forming temperature is raised to a level too high to permit commercial injection molding. Copolymers containing 0.5 to 1.5 moles of diacid derived units and low molecular weight glycol units as indicated have outstanding elastomeric properties and film forming temperatures which permit commercial injection molding.

Example 4

This example illustrates the necessity for including low molecular weight glycol derived units in the copolymers of this invention. A series of three copolymers, containing increasing amounts of 2-ethyl-2-methyl-propanediol-1,3 is prepared using a constant ratio of 1 mole of diacid derived units per mole of polytetramethyleneether glycol derived units. The copolymer prepared from equimolar amounts of adipyl chloride and the bischlorformate of polytetramethyleneether glycol having a molecular weight of about 1000 has a film forming temperature above 300° C. and is so high melting that it prevents the formation of test pieces required for physical testing. Copolymers B and C each contain the equivalent of 1 mole of adipyl chloride and 1 mole of polytetramethyleneether glycol of 1000 molecular weight and in addition Copolymer B contains the equivalent of 2 moles of 2-ethyl-2-methylpropanediol-1,3 and Copolymer C, 5.0 moles of the propanediol. The copolymers are prepared essentially by the procedure of Example 1 employing the quantities of reagents given in Table III. The data in Table III also include polymer composition in terms of parts per 100 parts and copolymer physical properties.

The data in Table III show that the inclusion of increasing amounts of low molecular weight glycol units in a polyether/amide copolymer reduce the film forming temperature. In addition, it will be noted that the copolymer B which falls within the present invention possesses good elastomeric properties as indicated by modulus and tensile and shows much improvement in set at break over the polyether/amide Copolymer A which could not be molded and Copolymer C which contained an excessive amount of low molecular weight glycol derived units.

TABLE III

| | Copolymer Sample | | |
|---|---|---|---|
| | A | B | C |
| Moles Low M.W. Glycol Units/Mole of Polyether Glycol Units | | 2.0 | 5.0 |
| Reagents: | | | |
| Bischloroformate or mixture, g | 50.0 | 50.0 | 52.0 |
| Adipyl Chloride, g | 8.14 | 5.67 | 4.06 |
| Piperazine, g | 8.08 | 11.18 | 14.7 |
| Copolymer composition in Parts/100 Parts: | | | |
| Diacid Units | 4.2 | 3.0 | 2.1 |
| Polyether Units | 74.8 | 54.1 | 38.3 |
| Low M.W. Glycol Units | | 12.5 | 22.2 |
| Copolymer Physical Properties: | | | |
| $M_{300}$, p.s.i | | 800 | 590 |
| $T_B$, p.s.i | | 5,900 | 4,000 |
| $E_B$, Percent | | 730 | 685 |
| $S_B$, Percent | | 19 | 5 |
| Tear strength, disc, p.l.i | | 75 | 43 |
| Tear strength, D-470, p.l.i | | | 60 |
| Hardness, Shore A | | | 79 |
| Compression Set, Percent (22 hrs./70° C.) | | 200 | 140 |
| Film Forming Temperature, ° C | ~320d. | 200 | 140 |

Example 5

A series of six copolymers is prepared which differ either in the specific low molecular weight glycol employed. Each of these six copolymers contain the equivalent of 1 mole of polytetramethyleneether glycol units (number average molecular weight 1000), the equivalent of 1 mole of diacid units supplied by adipic acid and varying amounts of low molecular weight glycol derived units as shown in Table IV. The copolymers are prepared by the procedures described in Examples 1 and 2 and the actual amounts of reagent for each preparation are listed in Table IV. Copolymer composition in parts per 100 parts and copolymer physical properties are also presented in Table IV.

The low molecular weight glycols employed are designated in Table IV by the following symbols: EMP=2-ethyl-2-methylpropanediol-1,3; BEP=2-butyl-2-ethylpropanediol-1,3; MBDO=2-methylbutanediol-1,4; BDO=butanediol-1,4; NGO=neopentyl glycol and PDO=pentanediol-1,5.

All of the polyether urethane/amide copolymers listed in Table IV contain preferred amounts of diacid units and low molecular weight glycol derived units. All possess film forming temperatures sufficiently low to permit injection molding on a commercial scale. In addition, all of these materials exhibit outstanding elastomeric properties.

Example 6

About 300 grams of polytetramethyleneether glycol having a number average molecular weight of 2000 is added to 500 ml. of liquid phosgene. The polyether glycol is converted to the corresponding bischloroformate by the procedure of Example 1. Following essentially the same procedure, the bischloroformate of butanediol-1,4 is prepared by adding 200 grams of diol to one liter of liquid phosgene. About 25 grams of bischloroformate of polytetramethyleneether glycol, 4.28 grams of adipyl chloride and 5.12 grams of the bischloroformate of butanediol-1,4 are dissolved in about 370 grams of methylene chloride. The methylene chloride solution is placed in a one-quart Waring Blendor where it is reacted with 7.42 grams of piperazine following essentially the procedures outlined in Examples 1 and 2. Copolymer so produced contains 58.1 parts per 100 parts of polyether glycol derived units, 10.2 parts per 100 parts of low molecular weight glycol derived units and 3.2 parts per 100 parts of diacid derived units. The isolated polymer has the following properties:

| | |
|---|---|
| $M_{300}$, p.s.i. | 1790 |
| $T_B$, p.s.i. | 10,000 |
| $E_B$, percent | 650 |
| $S_B$, percent | 90 |
| Disc tear, p.l.i. | 102 |
| Yerzley resilience, 25° C., percent | 84 |
| Compression set, percent 22 hrs./70° C. | 35 |
| Hardness Shore A | 72 |
| Film forming temperature, ° C. | 255 |

The film forming temperature of the corresponding polyether/amide copolymer is greater than 275° C.

Example 7

A mixture of about 500 grams of polypropyleneether glycol having a number average molecular weight of about 2000 and 106 grams of neopentyl glycol is converted to bischloroformates by the procedure of Example 1. To about 50 grams of the mixed bischloroformates is added 6.2 grams of adipyl chloride and the resulting blend is dissolved in 1400 grams of methylene chloride. About 11.07 grams of anhydrous piperazine dissolved in 450 ml. of methylene chloride are added to the solution of bischloroformates and adipyl chloride contained in a one-quart Waring Blendor. Thereafter, the procedure of Example 1 is followed to produce a copolymer having the following composition: 58.1 parts per 100 parts of polyether derived units, 11.3 parts per 100 parts of low molecular weight glycol derived units and 3.2 parts per 100

TABLE IV

| | A | B | C | D | E | F |
|---|---|---|---|---|---|---|
| Modifying Glycol | EMP | BEP | MBDO | BDO | NGO | PDO |
| Moles Low M.W. Glycol Units/Mole of Polyether Glycol Units | 2 | 2 | 2.5 | 2 | 2 | 2 |
| Reagents: | | | | | | |
| Bischloroformate Mixture, g | 50.0 | 50.0 | 50.0 | 250.0 | 50.0 | 35.63 |
| Adipyl Chloride, g | 5.67 | 5.40 | 5.34 | 29.3 | 5.78 | 4.12 |
| Piperazine, g | 11.18 | 10.54 | 12.07 | 57.8 | 11.42 | 8.30 |
| Copolymer Composition in Parts/100 Parts: | | | | | | |
| Diacid Units | 3.0 | 2.9 | 2.9 | 3.1 | 3.1 | 3.1 |
| Polyether Units | 54.1 | 51.8 | 51.5 | 55.7 | 54.9 | 55.0 |
| Low M.W. Glycol Units | 12.6 | 16.4 | 13.1 | 9.9 | 11.2 | 11.2 |
| Copolymer Physical Properties: | | | | | | |
| $M_{300}$, p.s.i. | 800 | 770 | 1,120 | 1,750 | 1,140 | 625 |
| $T_B$, p.s.i. | 5,900 | 5,700 | 6,400 | 7,400 | 6,700 | 6,500 |
| $E_B$, percent | 730 | 670 | 580 | 590 | 590 | 695 |
| $S_B$, percent | 19 | 10 | 8 | 65 | 0 | 30 |
| Yerz. Resilience, 25° C., percent | | 82 | 80 | 80 | 77 | 74 |
| Compression Set, percent (22 hrs./70° C.) | 35 | 34 | 55 | 32 | 34 | |
| Hardness, Shore A | 60 | 67 | 82 | 68 | 72 | |
| Tear Strength, Disc. p.l.i. | 89 | 134 | 180 | 89 | 120 | |
| Film Forming Temperature, ° C | 200 | 225 | 225 | 225 | 200 | 210 | parts of diacid derived units. The copolymer has the following properties:

| | |
|---|---|
| $M_{300}$, p.s.i. | 1000 |
| $T_B$, p.s.i. | 4800 |
| $E_B$, percent | 880 |
| $S_B$, percent | 27 |
| Disc tear, p.l.i. | 129 |
| Yerzley resilience, 25° C., percent | 73 |
| Compression set, percent 22 hrs./70° C. | 39 |
| Hardness, Shore A | 59 |

A similar polymer in which the amount of adipyl chloride is increased from 6.2 to 9 grams, contains 54.1 parts per 100 parts of polypropyleneether glycol derived units, 11.0 parts per 100 parts of low molecular weight glycol units, and 4.5 parts per 100 parts of diacid derived units. This second copolymer has the following properties:

| | |
|---|---|
| $M_{300}$, p.s.i. | 1800 |
| $T_B$, p.s.i. | 3800 |
| $E_B$, percent | 540 |
| $S_B$, percent | 25 |
| Disc tear, p.l.i. | 120 |
| Yerzley resilience, 25° C., percent | 66 |
| Compression set, percent 22 hrs./70° C. | 32 |
| Hardness, Shore A | 70 |

Example 8

This example describes the preparation of a copolymer in which all of the diacid derived units are introduced in the manner so as to be isolated from one another whereby in the formula

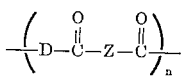

$n=1$. A mixture of about 500 grams of polytetramethyleneether glycol having a number average molecular weight of 1000 and 80 grams of 2-allyloxymethyl-2-methyl-1,3-propanediol is converted to bischloroformates by the procedure given in Example 1. About 300 grams of this mixture is added to 200 grams of piperazine dissolved in 2650 grams of methylene chloride. This addition is made in a well-agitated reactor and is carried out over a period of 450 minutes. The resulting methylene chloride solution containing the reaction product is washed 4 times with 500 gram portions of water and dried with anhydrous potassium carbonate. Methylene chloride is removed by distillation. The last traces of solvent are stripped from the reaction mass by sparging with nitrogen at 100° C. for 2 hours at a pressure of 20 mm. Hg. The product is terminated by secondary amine groups and has an amino nitrogen content of 2.64% by weight which corresponds to a calculated molecular weight of 1062.

This amine terminated urethane is converted into copolymer by reacting 250 grams, dissolved in 2650 grams of methylene chloride, with 41 grams of adipyl chloride for about 1 minute. This reaction is carried out in a 1-gallon Waring Blendor. Following this step, about 1000 grams of a 10% solution of sodium carbonate is added and the resulting emulsion is agitated for an additional 20 minutes. Solvent is removed from the viscous reaction mass by steam stripping and the resulting polymer is washed and dried on a conventional laboratory rubber mill.

When the amine terminated urethane is reacted with adipyl chloride as described above, the diacid derived units introduced by the adipyl chloride are included as single units into the polymer chains. This is true because free piperazine is required to join adipyl chloride derived units into groups and all amine groups are furnished by the amine terminated urethane prepolymer in this system.

Copolymer produced in this example contains 57.8 parts per 100 parts of polyether glycol derived units, 9.1 parts per 100 parts of low molecular weight glycol derived units and 4.85 parts per 100 parts of diacid units.

The properties of this copolymer are listed below and in addition, properties of a similar polymer having the same percentage composition but prepared by the preferred procedure of Example 1, are listed for comparison:

| | Copolymer of This Example | Copolymer Made by Procedure of Ex.1 |
|---|---|---|
| $\eta$inh. in m-Cresol | 1.5 | 1.44 |
| $M_{300}$, p.s.i. | 1,000 | 1,720 |
| $T_B$, p.s.i. | 5,000 | 6,000 |
| $E_B$, Percent | 840 | 580 |
| $S_B$, Percent | 62 | 15 |
| Yerzley Resilience, 25° C., Percent | 71 | 80 |
| Compression Set, Percent (22 hrs./70° C.) | 100 | 27 |
| Hardness, Shore A | 87 | 72 |
| Film Forming Temperature, ° C. | <100 | 270 |

The copolymer produced by the procedure of this Example has an inherent viscosity of 1.5, indicating that its molecular weight is in the same range which can be produced by the preferred procedure of Example 1. Stress-strain properties of the copolymer of this example, while lower than those of the comparative copolymer, are good. However, set at break and compression set are unacceptedly high for the copolymer of this example which contains only isolated diacid derived units. The film forming temperature of the copolymer containing only isolated diacid derived units is less than 100° C., while the comparison copolymer has a film forming temperature in excess of 200° C.

Example 9

This example illustrates the continuous preparation of the copolymers of this invention. The preparation is carried out in a pipeline reactor which employs centrifugal pumps spaced at intervals along the pipeline as mixers. In order that the pumps may serve more efficiently as mixers, they are installed so that they pump against the flow of process materials through the pipeline. Feed streams to the pipeline reactor are supplied at a sufficiently great pressure to overcome the back pressure created by the centrifugal pumps. About 1049 grams per minute of a solution of 19 grams of piperazine in 1030 grams of methylene chloride is introduced into a short length of 0.62-inch ID pipe which is connected to the outlet of a centrifugal pump (pump cavity 50 ml.; rotor speed, 2400 r.p.m.). About 87.5 grams per minute of a mixture containing 64.8% polytetramethyleneether glycol bischloroformate (prepared from glycol having a molecular weight of about 1000), 24.7% butanediol-1,4-bischloroformate and 10.5% adipyl chloride is introduced into the pump cavity through an inlet in the side of the pump casing. The two streams are well mixed by the centrifugal pump and the resulting blend of materials passed through about 2 feet of 0.62-inch I.D. pipe after which 330 ml. per minute of 10% aqueous sodium carbonate is introduced. The carbonate solution is introduced just before the stream from the first pump mixer enters the outlet port of a second centrifugal pump similar to that previously described. Temperature in the pipeline between the first and second pumps and prior to the addition of sodium carbonate solution is in the range of 50–55° C. Following the second pump, the reaction mass passes through 10 feet of 0.62-inch I.D. pipe, a third pump mixer, an additional 10 feet of 0.62-inch I.D. pipe, a fourth pump mixer and finally through 30 feet of additional 0.62-inch I.D. pipe. Throughout these latter portions of the system, the temperature of the reaction mass ranges from 40–50° C. After passing through the last length of pipe, the reaction mass discharges from the pipeline through a letdown valve set at 20 p.s.i.g. About 0.9 gram per minute of 4,4'-butylidene-bis (6-tertiary-butyl meta-cresol), in the form of a solution in methylene chloride, is added to the reaction mass issuing from the pipeline. The reaction mass discharges into a vessel having a holdup of about 18 liters where the reaction is completed.

Methylene chloride is removed from the product mass by steam distillation. Copolymer is collected by filtration and washed with hot water. After drying in air at 120° C. for 5 hours, copolymer is formed into stress-strain test pieces and compression set pellets by compression molding. The polymer has essentially the same properties as the copolymer prepared batchwise in Example 1.

The copolymer prepared batchwise in Example 2 can also be made continuously following the procedure described above by feeding about 89 grams per minute of a mixture containing 63.7% polytetramethyleneether glycol bischloroformate, 25.9% neopentyl glycol bischloroformate and 10.4% adipyl chloride in place of the 87.5 grams per minute of mixed bischloroformates and adipyl chloride used above.

Example 10

About 12 parts of the copolymer prepared in Example 1 is dissolved in 88 parts of methylene chloride. To 100 parts of this solution, 1.2 parts of distilled methylene bis (4-phenylisocyanate) is added and dissolved by mixing to form a solvent adhesive.

Test bonds are prepared between canvas and a variety of substrates by brush coating both surfaces with adhesive solution, allowing 15 minutes to dry, applying a second coat of solution and immediately pressing the surfaces together and rolling with a hand roller. Prior to use in forming bonds, the canvas is solution coated with a 10% methylene chloride solution of the copolymer prepared in Example 1. The bonds are tested after 4 days at room temperature by the ASTM D-419, 180° peel test. The maximum peeling force obtained on various substrates at 77° F. is tabulated below.

| Substrate: | Peeling force (p.p.l.i.) |
|---|---|
| Carbon steel—sandblasted | 22 |
| Brass plate—sandblasted | 16 |
| Plasticized polyvinyl chloride | 60 |
| Polymethyl methacrylate | 23 |
| Nylon plastic | 20 |
| Polyurethane elastomer | 69 |
| Polychloroprene | 98 |
| Chlorosulfonated polyethylene | 33 |
| Canvas | 95 |

Similar results are obtained from a solvent adhesive prepared from 12 parts of the copolymer prepared in Example 2, 1.2 parts of methylene bis(4-phenylisocyanate) and 88 parts of methylene chloride.

Example 11

A series of solvent adhesives is prepared by dissolving increasing amounts of distilled methylene bis(4-phenylisocyanate) in a 10% methylene chloride solution of the copolymer prepared in Example 1. Test bonds are prepared essentially by the procedure given in Example 10, aged for 1 day at room temperature and 180° peel strengths determined by ASTM D-419. Compositions of the adhesives, substrates and peel strengths are presented in the following table.

| Substrate | Peel Strength (p.p.l.i.) at Following Isocyanate Conc., Parts/100 Parts Copolymer | | | | |
|---|---|---|---|---|---|
| | 0 | 2.5 | 5 | 10 | 20 |
| Polished Aluminum | 4 | 30 | 24 | 30 | 25 |
| Polyurethane Elastomer | 80 | 100+ | 100+ | 100+ | 100+ |
| Polyester Fiberglass | 8 | 14 | 12 | 18 | 20 |

The results indicate a significant improvement in peel strength at all diisocyanate concentrations when compared with the control.

Example 12

A series of solvent adhesives is prepared by adding different di- and polyisocyanates at a level of about 3.7 parts per 100 parts of copolymer to a 10% methylene chloride solution of the copolymer prepared in Example 1. Canvas to polished aluminum test bonds are prepared by the procedure of Example 10, aged 1 day and 180° peel strengths determined by ASTM D-419. The added isocyanates and corresponding peel strengths obtained are tabulated below.

| Additive: | Peel strength (p.p.l.i.) |
|---|---|
| Crude methylene bis-(4-phenylisocyanate) [1] | 35 |
| Crude tolylene diisocyanate [2] | 22 |
| Distilled methylene bis-(4-phenylisocyanate) | 30 |
| Polyaryl polyisocyanate | 19 |

[1] Undistilled product resulting from the phosgenation of 4,4'-diaminodiphenylmethane.
[2] Undistilled product resulting from the phosgenation of an isomeric mixture of tolylene diamines (80% 2,4-isomer; 20% 2,6-isomer).

As many widely different embodiments of this invention may be made without departing from the spirit and scope thereof, it is to be understood that this invention is not limited to the specific embodiments thereof except as defined in the appended claims.

What is claimed is:
1. An injection moldable thermoplastic elastomer consisting essentially of the recurring units (a)

—O—G—O—

(b) —O—L—O—, and (c) —D—, all connected by the bivalent acyl radical

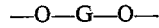

wherein O—G—O— is a bivalent radical obtained by removing the hydroxyl hydrogen atoms from a polyether glycol having an average molecular weight of 800 to 3000, —O—L—O— is a bivalent radical obtained by removing the hydroxyl hydrogen atoms from neopentyl glycol, —D— is a linear radical selected from the group consisting of $C_2$ and $C_4$ alkylene, and

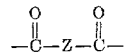

is a bivalent acyl radical in which Z is a bivalent radical obtained by removing the amine hydrogens from a diamine selected from the group consisting of piperazine, 2-methyl piperazine, 2,5-dimethylpiperazine, and 2,3,5,6-tetramethylpiperazine, said recurring units (a), (b), and (c) being present in amounts of 40–60 parts, 5–25 parts, and 2–5 parts, respectively, by weight per 100 parts by weight of said elastomer, the balance of said elastomer being the bivalent acyl radical

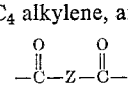

with the proviso that the elastomer contain units having the formula:

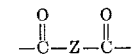

wherein the average value of $n$ is greater than 1.

References Cited

UNITED STATES PATENTS

| 2,929,801 | 3/1960 | Koller | 260—77.5 |
| 2,962,470 | 11/1960 | Jung | 260—77.5 |
| 3,044,987 | 7/1962 | Schaefgen | 260—77.5 |
| 2,708,617 | 5/1955 | Magat | 260—77.5 |
| 2,894,935 | 7/1959 | Tousignant | 260—77.5 |
| 2,929,802 | 3/1960 | Katz | 260—77.5 |

JAMES A. SEIDLECK, *Primary Examiner.*

DONALD E. CZAJA, LEON J. BERCOVITZ,
*Examiners.*

M. C. JACOBS, F. McKELVEY, *Assistant Examiners.*